United States Patent
Castelli et al.

(10) Patent No.: US 10,009,297 B2
(45) Date of Patent: Jun. 26, 2018

(54) ENTITY METADATA ATTACHED TO MULTI-MEDIA SURFACE FORMS

(71) Applicant: INTERNATIONAL BUSINESS MACHINES CORPORATION, Armonk, NY (US)

(72) Inventors: Vittorio Castelli, Croton on Hudson, NY (US); Radu Florian, Danbury, CT (US); Avirup Sil, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 14/645,935

(22) Filed: Mar. 12, 2015

(65) Prior Publication Data

US 2016/0267071 A1    Sep. 15, 2016

(51) Int. Cl.
*G06F 3/048* (2013.01)
*H04L 12/58* (2006.01)
*H04L 29/08* (2006.01)
*G06F 17/27* (2006.01)
*G06Q 10/10* (2012.01)

(52) U.S. Cl.
CPC .......... *H04L 51/04* (2013.01); *G06F 17/277* (2013.01); *G06Q 10/10* (2013.01); *H04L 67/10* (2013.01)

(58) Field of Classification Search
CPC ........... G06F 17/30029; G06F 17/3005; G06F 17/30867; G06F 17/3087; G06F 3/0481; G06F 17/30864; G06F 17/2785; G06F 17/241; G06F 17/30528; G06F 17/30734; G06F 17/2735

See application file for complete search history.

(56) References Cited

U.S. PATENT DOCUMENTS

| | | | |
|---|---|---|---|
| 8,898,583 B2 | 11/2014 | Bhola et al. | |
| 8,918,312 B1 * | 12/2014 | Rehling | G06Q 30/0282 704/9 |
| 9,367,608 B1 * | 6/2016 | Zhang | G06F 17/30657 |
| 9,552,352 B2 * | 1/2017 | Viegas | G06F 17/278 |
| 9,646,343 B2 * | 5/2017 | Hinchin | G06Q 40/02 |
| 2005/0108001 A1 * | 5/2005 | Aarskog | G06F 17/271 704/10 |

(Continued)

FOREIGN PATENT DOCUMENTS

EP    2793145 A2    10/2014

*Primary Examiner* — Tadesse Hailu
(74) *Attorney, Agent, or Firm* — Law Office of Jim Boice (57) ABSTRACT

A method, system, and/or computer program product displays related content on a user interface. An initial electronic document is analyzed to identify a mention in the initial electronic document. A mention descriptor of the mention in the initial electronic document is generated according to a context of the initial electronic document. The mention descriptor is mapped to a disambiguation identifier from a knowledge base that contains an entity related to the mention, where the disambiguation identifier identifies the entity within the knowledge base. The disambiguation identifier is associated with the initial electronic document, and is also associated with an entity metadata visualization panel. The disambiguation identifier is associated with the entity metadata visualization panel by mapping the entity metadata visualization panel to the disambiguation identifier. The entity metadata visualization panel is retrieved and displayed, on the user interface, as content related to the mention in the initial electronic document.

20 Claims, 7 Drawing Sheets

(56) References Cited

U.S. PATENT DOCUMENTS

| | | | |
|---|---|---|---|
| 2008/0082374 A1* | 4/2008 | Kennis | G06F 17/30569 705/7.36 |
| 2009/0091139 A1* | 4/2009 | Al-Mayahi | F03G 7/005 290/1 R |
| 2010/0250497 A1* | 9/2010 | Redlich | F41H 13/00 707/661 |
| 2010/0287210 A1* | 11/2010 | Olof-Ors | G06F 17/278 707/803 |
| 2011/0213655 A1* | 9/2011 | Henkin | G06Q 30/00 705/14.49 |
| 2011/0282888 A1* | 11/2011 | Koperski | G06F 17/30864 707/752 |
| 2012/0078945 A1* | 3/2012 | Hurst | G06F 17/241 707/769 |
| 2012/0215791 A1* | 8/2012 | Malik | G06F 17/30292 707/749 |
| 2013/0091139 A1* | 4/2013 | Rajpathak | G06F 17/2785 707/740 |
| 2013/0173604 A1 | 7/2013 | Li et al. | |
| 2013/0232129 A1* | 9/2013 | Cheng | G06F 17/30672 707/706 |
| 2014/0040245 A1* | 2/2014 | Rubinstein | G06F 17/30528 707/722 |
| 2014/0040274 A1* | 2/2014 | Aravamudan | G06F 17/30386 707/741 |
| 2014/0040275 A1* | 2/2014 | Dang | G06F 17/2785 707/741 |
| 2014/0142922 A1* | 5/2014 | Liang | G06F 17/21 704/9 |
| 2014/0229467 A1* | 8/2014 | Roseman | G06F 17/278 707/723 |
| 2015/0248222 A1* | 9/2015 | Stickler | G06Q 30/02 715/763 |
| 2017/0139880 A1* | 5/2017 | Agostino | G06F 17/2235 |

* cited by examiner

ENTITY METADATA ATTACHED TO MULTI-MEDIA SURFACE FORMS

BACKGROUND

The present disclosure relates to the field of electronic devices, and specifically to the field of electronic devices that display content on a user interface. Still more specifically, the present disclosure relates to the field of identifying and displaying related content on a user interface.

Networked computers are able to present various types of content, including but not limited to multi-media content such as webpages. Mentions of named entities such as people, organizations or locations displayed in a multimedia document (e.g., a webpage) are often called multi-media surface forms. For example, a group of mentions (also called surface forms) may include "Nickname A", "Alias A", "Adopted Name A", "Pseudonym A", all of which refer to the same entity, "Person A".

Thus, a webpage (multi-media document) may display a written textual document (a first type of media), a photograph (a second type of media) with or without textual content (e.g. captions of photos in blogs or social media posts etc.), and a video clip (a third type of media) with or without textual content (e.g. comments in posted videos, or titles of videos etc.). The content displayed on a multi-media document may include a mention (i.e., an instance) of a person, place, thing, or topic (subject).

SUMMARY

A method, system, and/or computer program product displays related content on a user interface. An initial electronic document is analyzed to identify one or more mentions in the initial electronic document. The initial document is analyzed to detect the boundaries of named mentions in the initial electronic document. A mention descriptor of one or more mentions in the initial electronic document is generated according to a context of the initial electronic document. The mention descriptor is mapped to a disambiguation identifier from a knowledge base that contains an entity that is related to the mention, where the disambiguation identifier identifies the entity within the knowledge base. The disambiguation identifier is associated with the initial electronic document. The disambiguation identifier is also associated with an entity metadata visualization panel, by appending the disambiguation identifier to the entity metadata visualization panel after mapping the entity metadata visualization panel to the disambiguation identifier. The entity metadata visualization panel is retrieved and then displayed, on the user interface, as content that is related to the mention in the initial electronic document.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
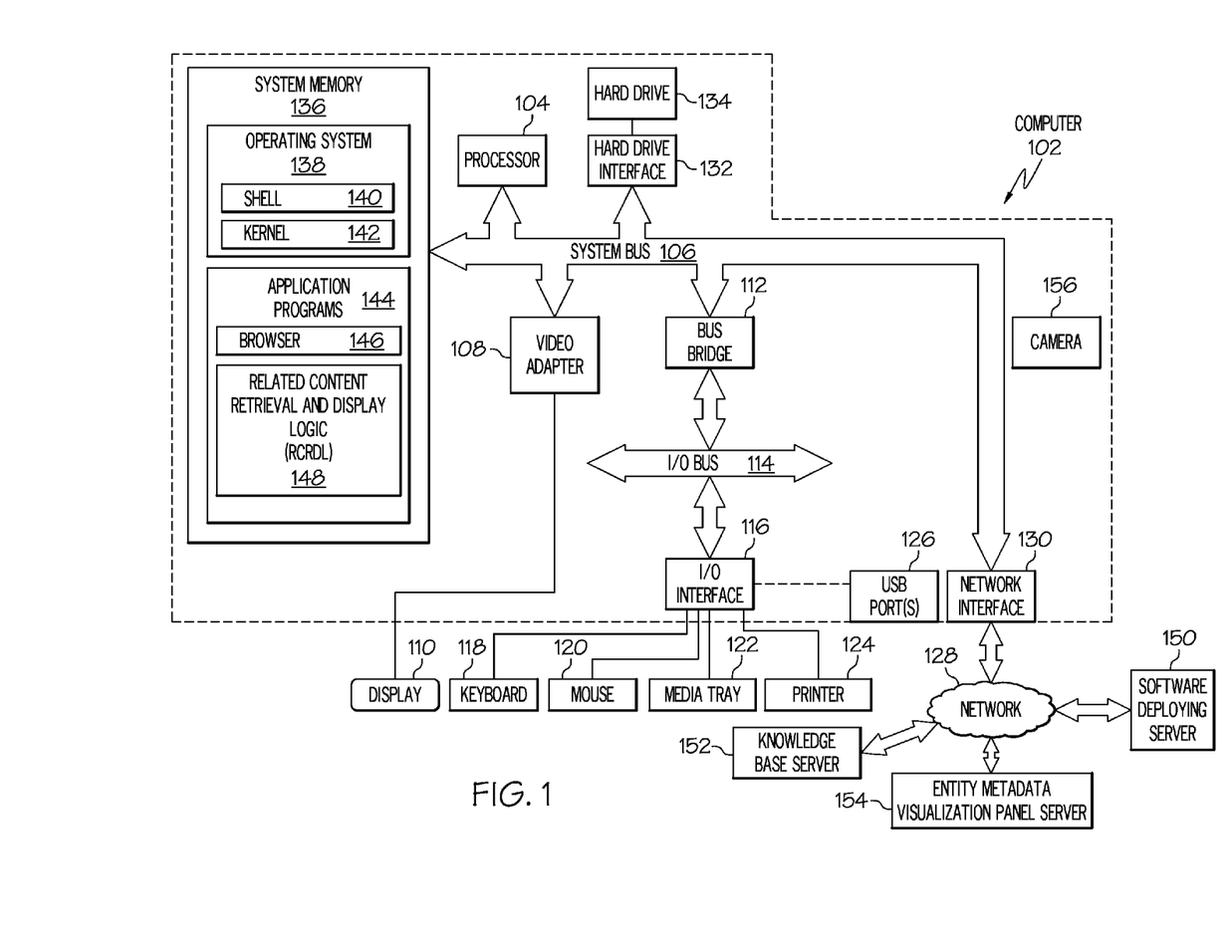
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 102 may be utilized by software deploying server 150 and/or knowledge base server 152 and/or entity metadata visualization panel server 154 shown in FIG. 1.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a related content retrieval and display logic (RCRDL) 148. RCRDL 148 includes code for implementing the processes described below, including those described in FIGS. 2-4. In one embodiment, computer 102 is able to download RCRDL 148 from software deploying server 150, including in an on-demand basis, wherein the code in RCRDL 148 is not downloaded until needed for execution. In one embodiment of the present invention, software deploying server 150 performs all of the functions associated with the present invention (including execution of RCRDL 148), thus freeing computer 102 from having to use its own internal computing resources to execute RCRDL 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

For purposes of illustrating how the present invention can be utilized in accordance with one or more embodiments, consider now a scenario in which a user is reading a web-page or a piece of email. Assume that the user wants more information about one or more of the persons, organizations, countries, etc. mentioned in the document. In particular, assume that the user wants to know both background information as well as up-to-date or extremely current information about the entities (e.g., Is this entity "trending" in a social media service?). Issuing a query to one or more search engines corresponding to the ambiguous mentions of entities, in order to obtain additional information about such entities, is unwieldy. The present invention avoids this problem, particularly with regard to the following issues.

First, names of entities can be ambiguous. Name ambiguity arises for several reasons: multiple persons can have the same name; famous people are often cited by family name only; people often distort the names of people for argumentative/demonstrative purposes; etc.

Second, social media is difficult to search. For example, certain types of social media require hashtags or other metadata descriptors in order to retrieve the social media postings.

A "mention of an entity", or simply a "mention" (also called a "surface form"), is defined herein as a piece of text that refers to a particular person, place, thing, or subject in an electronic multimedia document.

Figure 2:
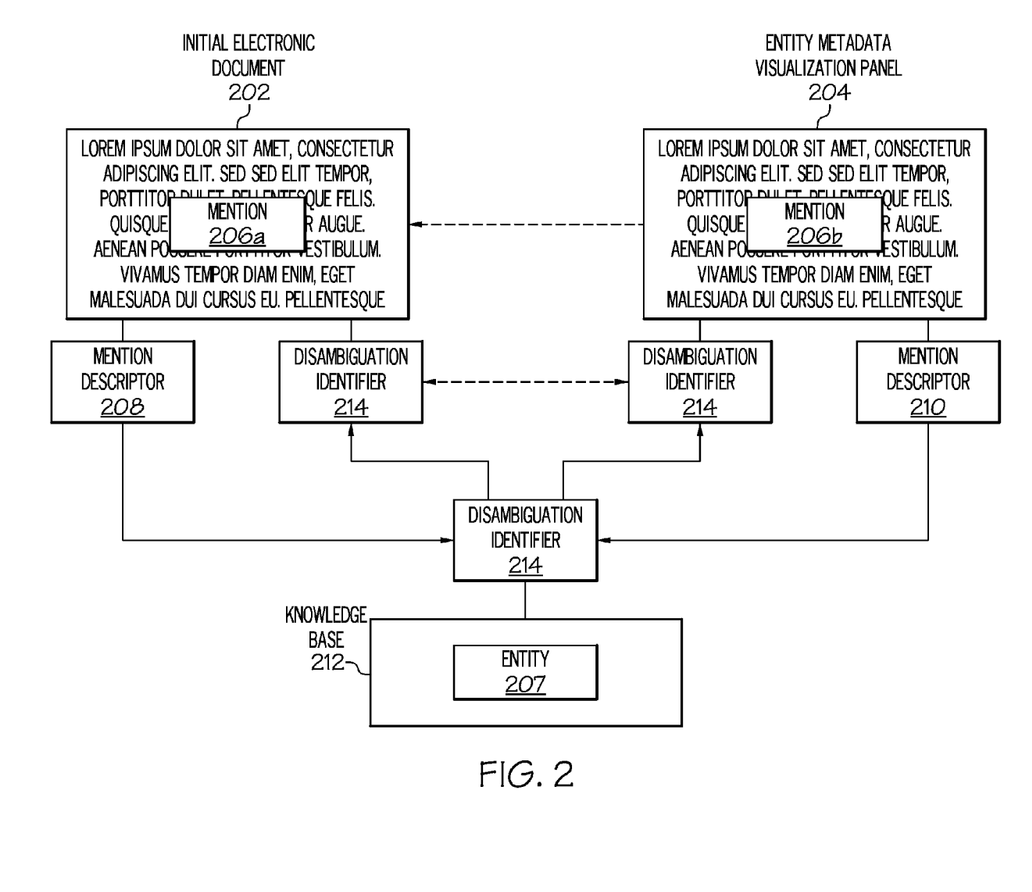
FIG. 2 illustrates a relationship between an initial electronic document and an entity metadata visualization panel that populates a user interface that initially presented the initial electronic document.

An "entity" is defined as an entry in a knowledge base, such as knowledge base 212 shown in FIG. 2.

As described herein, the present invention provides a new and useful method for uniquely disambiguating mentions of entities in a multimedia document, and then mapping disambiguated entities to a known (possibly dynamic) knowledge base, such as an on-line encyclopedia. The present invention automatically retrieves candidate information from a multiplicity of sources including, but not limited to, social media, and identifies relevant entities in the retrieved candidates that have been mapped to the same knowledge base, thus matching the contextual information for the ambiguous mentions of entities in the multimedia document. The present disclosure further teaches a process for displaying the matched retrieved results for each of the mentions of entities in the multi-media document.

Note that the present invention is language independent. That is, once the system is trained on one language (e.g., English), the same system can disambiguate entities in another language (e.g., Spanish), since one model can be used by multiple languages, assuming that there exists an external knowledge base for the target language.

With reference now to FIG. 2, a relationship between an initial electronic document 202 and an entity metadata visualization panel 204 that will populate a user interface that initially presented the initial electronic document 202 is presented. The initial electronic document 202 is displayed on a computer display, such as display 110 shown in FIG. 1. More specifically, a user interface (i.e., a display screen on which a graphical user interface is presented) initially displays the initial electronic document 202 on the user interface. Examples of the initial electronic document 202 and/or the entity metadata visualization panel 204 include, but are not limited to, a webpage, an e-mail, a text message, a video, etc. For illustrative purposes, the initial electronic document 202 and the entity metadata visualization panel 204 will be primarily described as two webpages.

As shown in FIG. 2, within initial electronic document 202 is a mention 206a. Mention 206a is an instance of (i.e., piece of text that refers to) a particular person, place, thing, or topic. For example, mention 206a may be the word/phrase "buffalo". However, mention 206a is initially ambiguous, since "buffalo" may be an animal (i.e., the American buffalo, also called the bison), a person (e.g., Buffalo Bill), a place (e.g., Buffalo, N.Y.), an enterprise (e.g., the Buffalo Bills football team, often referred to simply as "Buffalo"), or a topic (e.g., to "buffalo" someone, meaning to baffle someone). In order to determine what "buffalo" means in initial electronic document 202, an analysis of the context of the initial electronic document 202 is performed. For example, if initial electronic document 202 includes a phrase "28-14", a system (e.g., logic contained within RCRDL 148 shown in FIG. 1) may determine that this is likely a football score, and thus "buffalo", even if never referred to as the "Buffalo Bills" within the initial electronic document 202, is the football team.

However, if initial electronic document 202 includes terms such as "recipe" and "high protein" and "350 degrees", then RCRDL 148 can determine that "buffalo" refers to meat from a bison, and that initial electronic document 202 is a document related to cooking or restaurants.

Once the mention 206a is initially disambiguated (i.e., a preliminary determination is made regarding what the mention 206a actually describes and/or refers to), a mention descriptor 208 that is specific for a particular unambiguous description of mention 206a is associated with the initial electronic document 202. In the example of the animal "buffalo" being used as food, mention descriptor 208 (e.g., "culinary arts") may describe not only bison, but also the cooking preparation of buffalo, according to the context of the initial electronic document 202. Thus, contextual information about the term "buffalo" is extracted from the initial electronic document 202.

One feature of the present invention is the ability to locate documents that are related to mention 206a. However, mention descriptor 208 was generated specifically for mention 206a within the context of initial electronic document 202. As shown in FIG. 2, entity metadata visualization panel 204 may include a mention 206b, which is a form of mention 206a. That is, assume again that mention 206a is "buffalo", meaning the animal. Assume further that mention 206b is "bison". The terms "buffalo" and "bison" are synonyms, and thus mention descriptor 210 could match (i.e., be the same as) mention descriptor 208. However, it is more likely that mention descriptor 210 is different from mention descriptor 208, since the context of initial electronic document 202 and the context of entity metadata visualization panel 204 may be different. That is, initial electronic document 202 may be a cooking blog, while entity metadata visualization panel 204 may be a restaurant blog. As such, the content and/or format of mention descriptor 208 will be different than that of mention descriptor 210.

In order to associate entity metadata visualization panel 204 with initial electronic document 202, an intermediate step is performed by the present invention. Specifically, a mention is mapped to a disambiguation identifier from a knowledge base by providing its mention descriptor to a disambiguation system, as described herein, by mapping mention descriptors to disambiguation identifiers from a knowledge base.

Consider now knowledge base 212 shown in FIG. 2. Examples of knowledge base 212 include, but are not limited to, online encyclopedias and online dictionaries. Knowledge base 212 includes multiple entity entries, including an entry for entity 207, which is related to mention 206a and mention 206b discussed above. That is, entity 207 refers to bison, but not to water buffalos or other animals unrelated to mention 206a and mention 206b. As such, a disambiguation identifier 214 is associated with entity 207 from knowledge base 212. Disambiguation identifier 214 provides a clear and unambiguous identification of the American bison, which is what mention 206a and mention 206b relate to.

Mention descriptor 208 is then associated with disambiguation identifier 214, through the use of a lookup table, semantic association, etc. Disambiguation identifier 214 is then associated with initial electronic document 202 as a tag. Similarly, mention descriptor 210 is associated with disambiguation identifier 214. Disambiguation identifier 214 is likewise associated with entity metadata visualization panel 204 as a tag. Since initial electronic document 202 and entity metadata visualization panel 204 both are tagged with the same disambiguation identifier 214, logic is able to determine that initial electronic document 202 and entity metadata visualization panel 204 are topically related. Again, without the common disambiguation identifier 214 held by both initial electronic document 202 and entity metadata visualization panel 204, such a relationship cannot be derived, particularly by comparing the mention descriptor 208 to the mention descriptor 210 (due to the different contexts from which the mention descriptor 208 and the mention descriptor 210 were generated).

Once an association is made between initial electronic document 202 and entity metadata visualization panel 204 (per the common association of disambiguation identifier 214 with each of the electronic files related to 202/204), the entity metadata visualization panel 204 is retrieved and displayed on a user interface that displays/displayed the initial electronic document 202. That is, as shown in FIG. 2, a pointer goes from the instance of the disambiguation identifier 214 associated with initial electronic document 202 to the instance of the disambiguation identifier 214 associated with the entity metadata visualization panel 204. This pointer causes entity metadata visualization panel 204 to be retrieved and displayed on the user interface (display) that presented the initial electronic document 202. Although in one embodiment of the present invention the entity metadata visualization panel 204 can replace initial electronic document 202 on the user interface (such that only entity metadata visualization panel 204 is now displayed), in a preferred embodiment of the present invention entity metadata visualization panel 204 is displayed together with (contemporaneously with) initial electronic document 202. In another embodiment, however, the entity metadata visualization panel 204 is displayed on unused real estate on the user interface (or in a pop-up window that appears only if activated by a hover or other user input), thus leaving the appearance and display of the original initial electronic document 202 unaffected.

Figure 3:
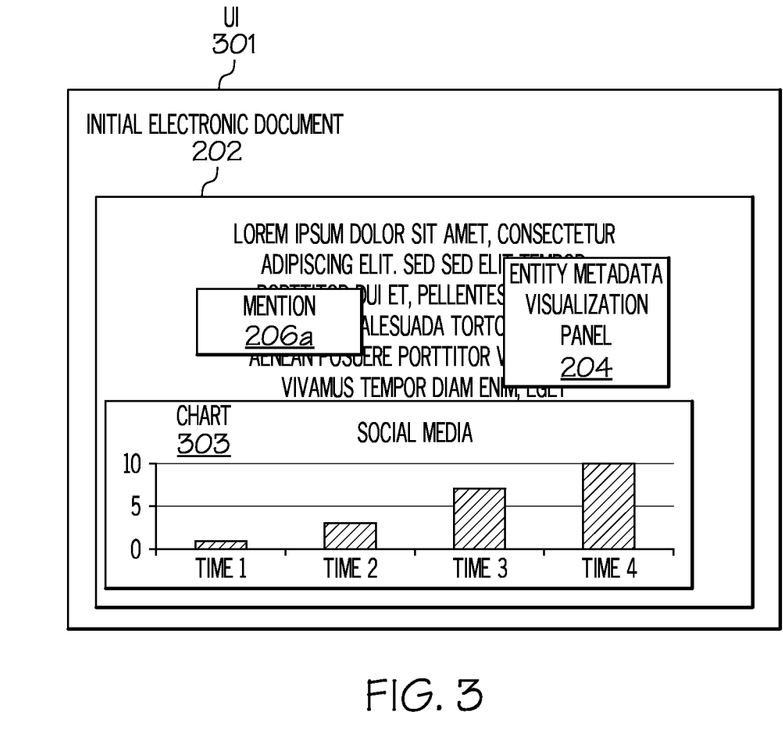
FIG. 3 depicts a user interface that is populated with the initial electronic document and entity metadata visualization panel(s) illustrated in FIG. 2.

For example, consider the user interface 301 shown in FIG. 3. As shown, initial electronic document 202 is displayed (along with mention 206a). Entity metadata visualization panel 204 is also displayed on user interface 301, thus providing augmented information about mention 206a that comes from entity metadata visualization panel 204 (which is the source of additional information about mention 206a).

While entity metadata visualization panel 204 has been described above as being another webpage or similar electronic document, in one embodiment of the present invention entity metadata visualization panel 204 may be from a social media service. For example, assume that entity metadata visualization panel 204 is a text message that is sent out to followers of a text message sender. Assume further that the entity metadata visualization panel 204 carries a hashtag that identifies the subject of the entity metadata visualization panel 204. This hashtag may be manually created by the author of the entity metadata visualization panel 204, or it may be derived from the disambiguation identifier 214 shown in FIG. 2.

For example, assume that the disambiguation identifier 214 discussed in FIG. 2 is "bison". This term ("bison") can then be automatically populated into the social media text message as the hashtag "#bison". A chart 303 can then be auto-populated onto user interface 301, showing 1) how many times the particular entity metadata visualization panel 204 (a social media text message) is forwarded on to followers of the author of that social media text message; 2) how many social media text messages having the same hashtag have been transmitted (from one or more authors); or 3) how many times the original entity metadata visualization panel 204 is referred to by other published/transmitted electronic documents. Similarly, chart 303 can be auto-populated onto user interface 301 in various embodiments, such as showing 1) how many times the particular initial electronic document 202 (a social media text message) is forwarded on to followers of the author of that social media text message; 2) how many social media text messages having the same hashtag have been transmitted (from one or more authors); or 3) how many times the initial electronic document 202 is referred to by other published/transmitted electronic documents.

In embodiment 1), assume that a particular author of short text messages publishes (via a social media service) entity metadata visualization panel 204. As shown in chart 303, more and more recipients of entity metadata visualization panel 204 retransmit the entity metadata visualization panel 204 to other recipients over time. In one embodiment, time 4 is the latest real-time count, showing that the transmission/retransmission of entity metadata visualization panel 204 is trending upward. A chart similar to chart 303 can likewise show the trending of initial electronic document 202.

In embodiment 2), assume that various authors are transmitting different social media text messages that have the same hashtag as entity metadata visualization panel 204 (and/or initial electronic document 202). As shown in chart 303, more and more related (i.e., having the same hashtag that was based on the disambiguation identifier 214 shown in FIG. 2) social media text messages are being transmitted/retransmitted over time (i.e., are trending upward).

In embodiment 3), assume that various authors are making reference to initial electronic document 202 and/or entity metadata visualization panel 204, either in the same format or in other formats. For example, assume that initial electronic document 202 is a webpage, and that various social media text messages are referencing that webpage. As shown in chart 303, such social media text messages (i.e., having a same hashtag based on the disambiguation identifier 214 shown in FIG. 2) are increasing in number (i.e., are trending upward).

Returning to FIG. 2, note that mention 206a and mention 206b may be the same nominal term ("buffalo"), different nominal terms that are synonyms ("buffalo" and "bison"), or a nominal term ("buffalo" for mention 206a) and a pronominal term ("low fat protein" for mention 206b, where "low fat protein" is a pronominal phrase for "buffalo"). Nonetheless, the present logic is able to determine that the initial electronic document 202 and the entity metadata visualization panel 204 are contextually and/or topically related, even if the terms used by mention 206a and mention 206b are not identical.

Figure 4:
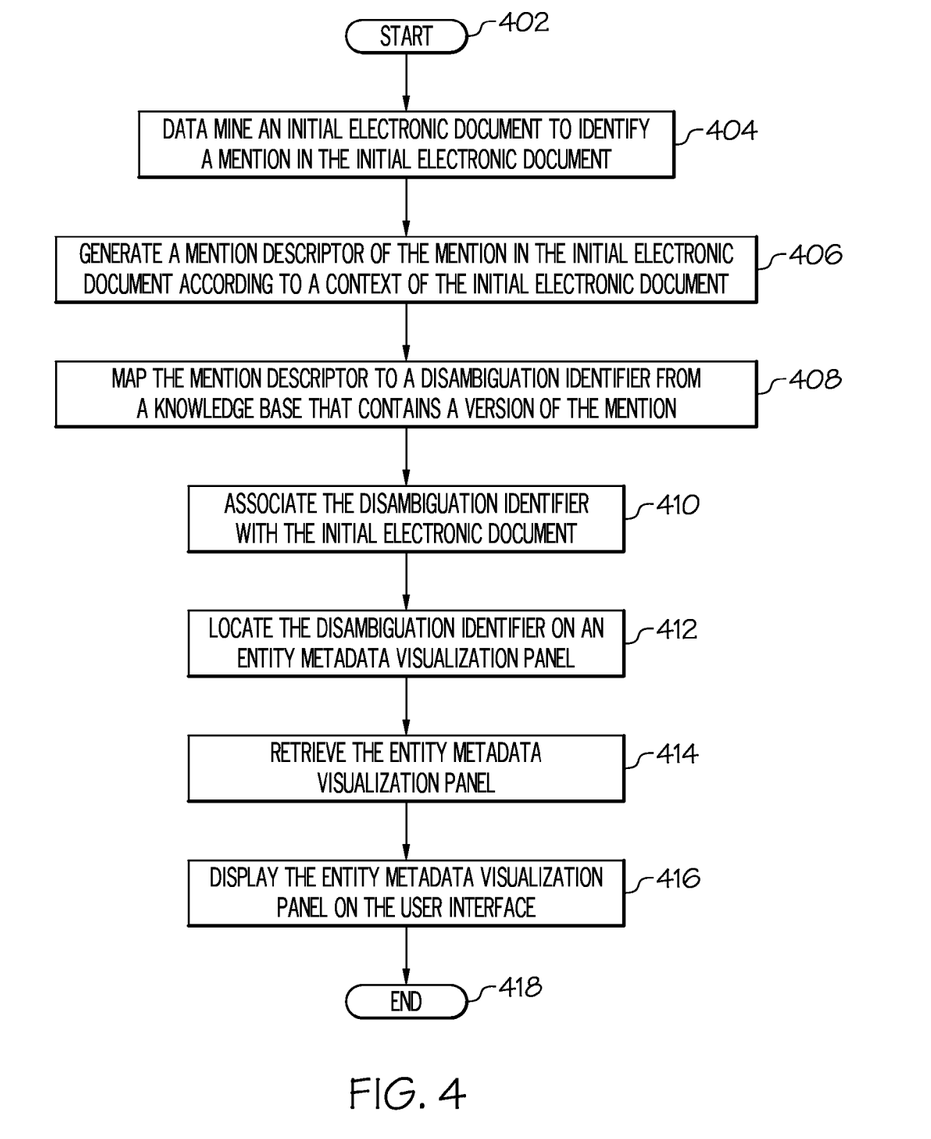
FIG. 4 is a high-level flow chart of one or more steps performed by a processor to display related electronic documents on a user interface.

With reference now to FIG. 4, a high-level flow chart of one or more steps performed by one or more processors to display related electronic documents on a user interface is presented.

After initiator block 402, an initial electronic document (e.g., initial electronic document 202 shown in FIG. 2) is analyzed to identify a mention (e.g., mention 206a in FIG. 2) in the initial electronic document, as described in block 404. The mention 206a can be identified in various manners. For example, mention 206a may simply be a most commonly used term (other than known insignificant words such as "the", "and", etc.) within the initial electronic document, thus indicating that this term is what the initial electronic document 202 is about.

Alternatively, the context of the initial electronic document can be ascertained by identifying various phrases, adjectives, numeric values, etc. Based on this context, a mention that is related to the context is then deemed to be the mention of interest. For example, if the initial electronic document contained the terms "restaurant" and "barbeque" and "meat", then the mention "buffalo" (in all lower case letters) would be identified as the mention to which the context "food preparation" pertains.

Returning to FIG. 4, a mention descriptor (e.g., mention descriptor 208 or mention descriptor 210 shown in FIG. 2) of the mention in the initial electronic document is then generated according to a context of the initial electronic document, as described in block 406. As described herein, the mention descriptor provides an initial descriptor of the mention, and is appended to (or otherwise associated with, as in a lookup table) the initial electronic document (as shown in FIG. 2).

As described in block 408 of FIG. 4, the mention descriptor is then mapped to a disambiguation identifier (e.g., disambiguation identifier 214 in FIG. 2) from a knowledge base (e.g., knowledge base 212 in FIG. 2) that contains a reference to an entity (e.g., entity 207), such that the disambiguation identifier identifies the entity within the knowledge base. Note that the entity found within the knowledge base may be an exact copy of the mention found in the initial electronic document, or it may be a variation (e.g., a synonym or a pronominal phrase/term/word).

As described in block 410 of FIG. 4, the disambiguation identifier is then associated with the initial electronic document, as depicted in FIG. 2.

As described in block 412 of FIG. 4, the disambiguation identifier is located (i.e., identified, discovered, etc.) on an entity metadata visualization panel 204 (shown in FIG. 2). The disambiguation identifier was appended to the entity metadata visualization panel 204 using the same process as that used to append/associate the disambiguation identifier to the initial electronic document. That is, the disambiguation identifier was appended to the entity metadata visualization panel 204 after mapping the entity metadata visualization panel 204 to the disambiguation identifier found in the knowledge base.

As described in block 414 of FIG. 4, the entity metadata visualization panel 204 is retrieved, and then displayed, on the user interface, as related content that is related to the mention in the initial electronic document (block 416), as depicted in FIG. 3. The flow chart from FIG. 4 ends at terminator block 418.

As described herein, in one embodiment of the present invention the initial electronic document is from a social media service. In this embodiment, a trending graph (e.g., chart 303 shown in FIG. 3) is displayed on the user interface on which the initial electronic document was/is displayed, as depicted in FIG. 3. As described herein, the trending graph describes a frequency of the initial electronic document and/or the entity metadata visualization panel 204 being viewed within predetermined time periods.

As described herein, in one embodiment of the present invention the social media service is a short messaging service that allows users to publish short text messages.

In one embodiment of the present invention, the social media service is a video sharing service that allows users to share video uploads via a website.

In one embodiment of the present invention, a sentiment analysis is performed on the initial electronic document, where the sentiment analysis identifies an emotion of a first author of the initial electronic document. A sentiment analysis is also performed on the entity metadata visualization panel, where the sentiment analysis identifies an emotion of a second author of the entity metadata visualization panel. The sentiment analysis can be based on context words (e.g., terms used that are associated with certain emotions, such as anger, relief, etc.), or on the meaning of the phrases/content itself (e.g., writings that convey a sense of anger, relief, etc.) within the entity metadata visualization panel. A trending graph of the emotion of the first author and the emotion of the second author is then generated and displayed on the user interface. In one embodiment, the trending graph is displayed on, over, or adjacent to the initial electronic document, while in another embodiment the trending graph is displayed on a separate window (including, but not limited to, a pop-up window that is activated by the user.)

In one embodiment of the present invention, the knowledge base contains multiple disambiguation identifiers (entities). These multiple disambiguation identifiers are hierarchically categorized according to their scope, their frequency of usage, and/or their age.

For example, if a first entity describes a broad range of subjects, while a second entity describes a narrower range of subjects (i.e., a subgroup of the subjects described by the first entity), then the first entity is hierarchically higher than the second entity.

Similarly, if a first entity is utilized (as a disambiguation identifier) more frequently than a second entity, then the first entity is hierarchically higher than the second entity.

Likewise, if a first entity was created before a second entity, then the first entity is hierarchically higher than the second entity. Alternatively, if a first entity was created before a second entity, then the first entity may be hierarchically lower than the second entity.

A graph of the hierarchically categorized disambiguation identifiers is then generated and displayed on the user interface.

In one embodiment of the present invention, an analysis of the entity metadata visualization panel is performed to identify other topics presented in the entity metadata visualization panel. That is, the entity metadata visualization panel (e.g., element 204 in FIG. 2) may contain text related to the initial electronic document 202 as well as other topics. A trending graph is generated based on these other topics, such that the trending graph shows the other topics that are related to the entity metadata visualization panel 204. The trending graph is then displayed on the user interface, either on top of or next to the initial electronic document, or on a separate window.

An entity tag identifies an entity as being related to either a person, an organization, or a geopolitical entity. Thus, one embodiment of the present invention utilizes such entity tags to further map the mention descriptor to the disambiguation identifier. That is, an entity tag is appended to the mention descriptor. The entity tag itself may be generated according to the context of the initial electronic document and/or the entity metadata visualization panel 204, thereby identifying whether the entity/mention is a person, an organization, or a geopolitical entity. Once the entity tag is appended to the mention descriptor, it is matched to an entity tag from the disambiguation identifier at the knowledge base to further map the mention descriptor to the disambiguation identifier at the knowledge base.

In one embodiment of the present invention, the mention is not part of the entity metadata visualization panel. That is, a synonym or pronominal phrase may be in the entity metadata visualization panel, but not the mention itself that is found in the initial electronic document. In one embodiment, there is no related mention at all in the entity metadata visualization panel (i.e., mention 206b shown in FIG. 2 is not found in entity metadata visualization panel 204). Rather, the mention descriptor 210 is generated solely by the context of the entity metadata visualization panel 204. Thus, the context of the entity metadata visualization panel 204 (e.g., barbeque) is enough to link the entity metadata visualization panel 204 to the initial electronic document 202 via their common disambiguation identifier 214.

As described herein, the present invention presents a method and system for displaying related content on a user interface. When a user interface displays a multimedia document, such as a webpage, a social media communication, a video sharing website, etc., the present invention analyzes the multimedia document/content. Entities (i.e., mentions of entities) in the multi-media document are identified/detected according to the context of the multimedia document. The entities/mentions are then mapped to unique identifiers of entities in an external knowledgebase. These identifiers remove any ambiguities regarding who/what a particular entity/mention is. The identifiers are then used to construct metadata about each copy and/or version of the entity found in various entity metadata visualization panel that contain content that is related to the entity/mention. The constructed metadata thus provides a tag for locating and retrieving the various entity metadata visualization panel for display on the user interface.

The present invention may be implemented using cloud computing, as now described. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
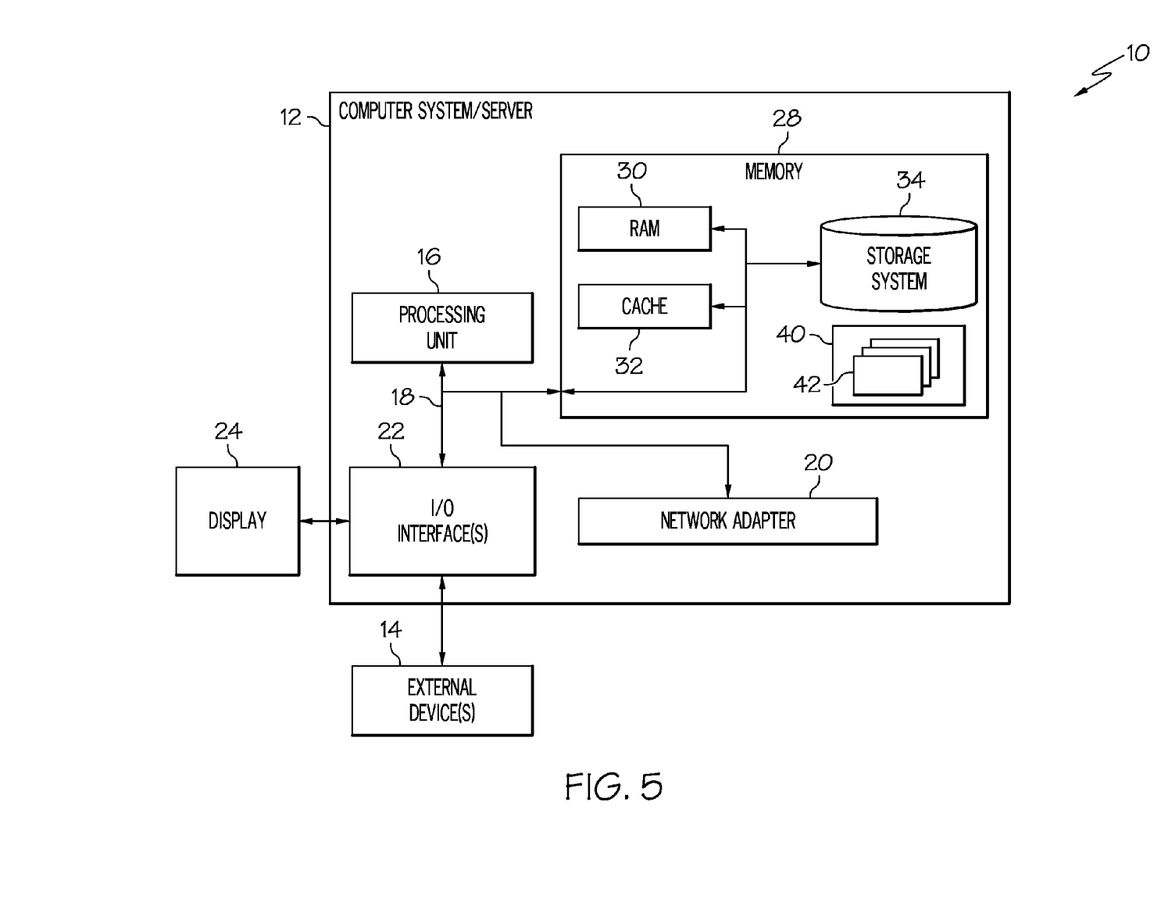
FIG. 5 depicts a cloud computing node according to an embodiment of the present disclosure.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
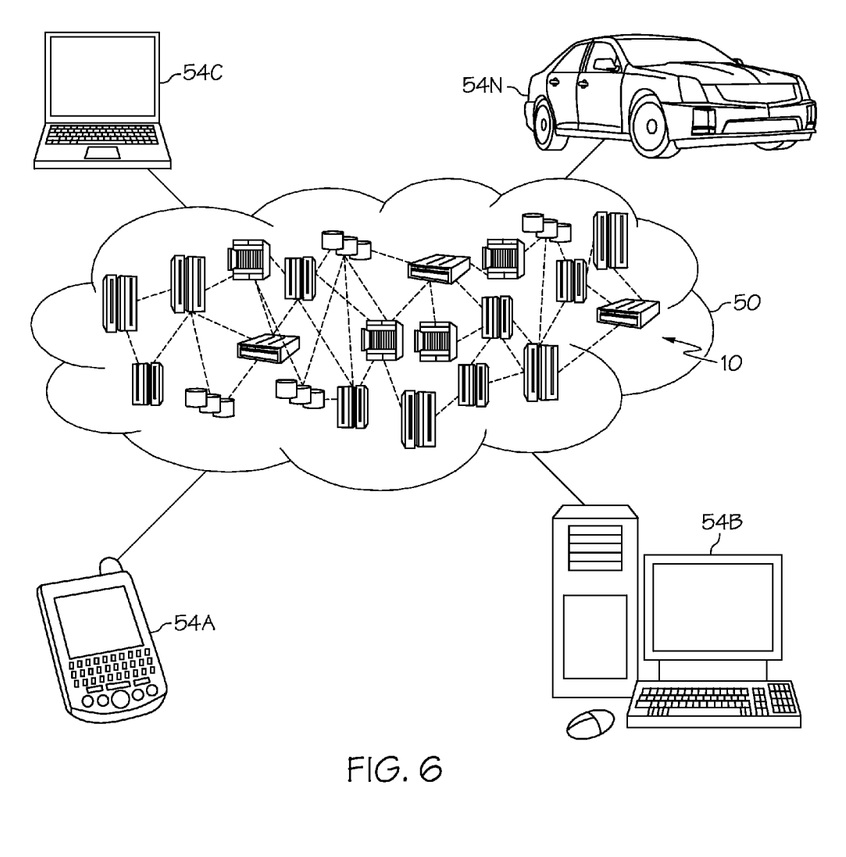
FIG. 6 depicts a cloud computing environment according to an embodiment of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone MA, desktop computer MB, laptop computer 54C, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices MA-N shown in FIG. 2 are intended to be illustrative only and that computing nodes 10 and cloud computing environment 50 can communicate with any type of computerized device over any type of network and/or network addressable connection (e.g., using a web browser).

Figure 7:
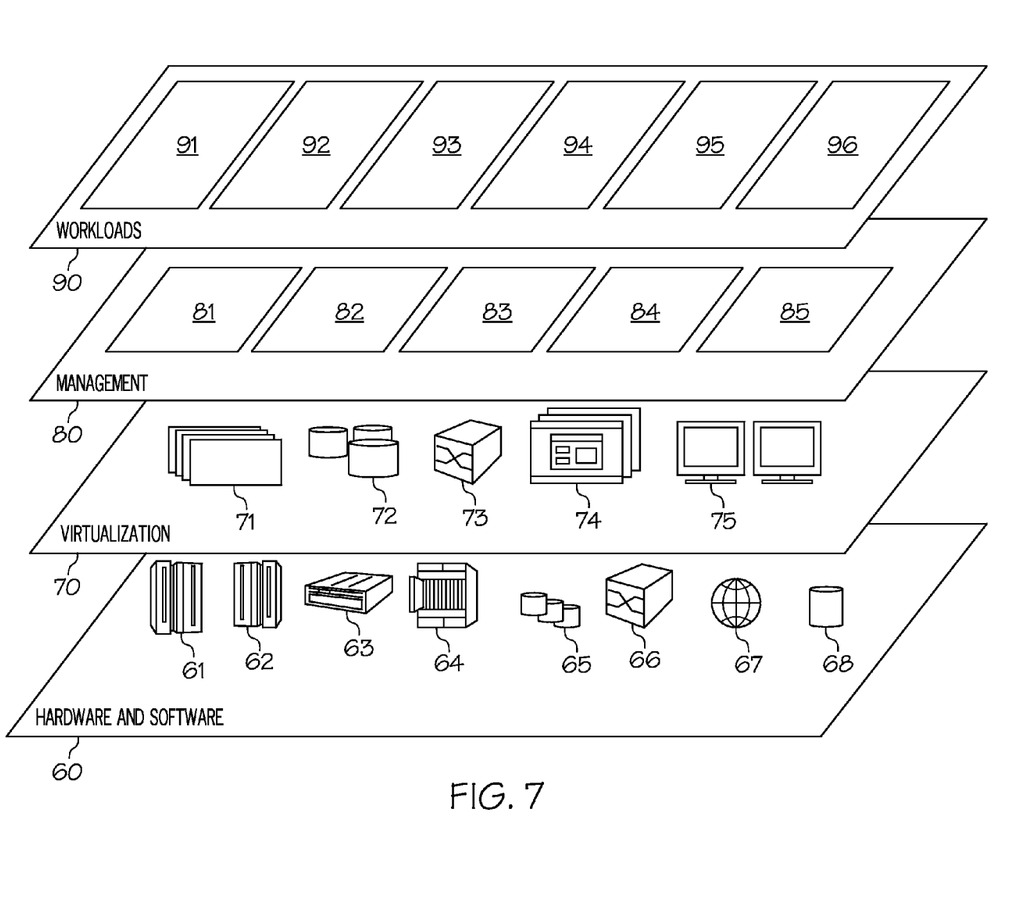
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and related content retrieval and display processing 96.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of displaying related content on a user interface, the method comprising:

analyzing, by one or more processors, an initial electronic document to identify a first mention in the initial electronic document;

generating, by one or more processors, a first mention descriptor of the first mention in the initial electronic document according to a context of the initial electronic document;

appending, by one or more processors, the first mention descriptor to the initial electronic document;

mapping, by one or more processors, the first mention descriptor from the initial electronic document to a disambiguation identifier from a knowledge base that contains a version of the first mention, wherein the disambiguation identifier is an entity within the knowledge base;

associating, by one or more processors, the disambiguation identifier with the initial electronic document;

locating, by one or more processors, the disambiguation identifier on an entity metadata visualization panel, wherein the disambiguation identifier was appended to the entity metadata visualization panel after mapping the entity metadata visualization panel to the disambiguation identifier from the knowledge base, and wherein the entity metadata visualization panel was mapped to the disambiguation identifier by mapping a second mention descriptor for a second mention in the entity metadata visualization panel to the disambiguation identifier;

retrieving, by one or more processors, the entity metadata visualization panel; and displaying, on the user interface, the entity metadata visualization panel as related content that is related to the first mention in the initial electronic document.

2. The method of claim 1, wherein the initial electronic document is from a social media service, and wherein the method further comprises:

analyzing a frequency of the initial electronic document being viewed within predetermined time periods;

generating a trending graph of the frequency of the initial electronic document being viewed within the predetermined time periods; and displaying, on the user interface, the trending graph.

3. The method of claim 2, wherein the social media service is a short messaging service.

4. The method of claim 2, wherein the social media service is a video sharing service.

5. The method of claim 1, further comprising:

performing a sentiment analysis on the initial electronic document, wherein the sentiment analysis identifies an emotion of a first author of the initial electronic document;

performing a sentiment analysis on the entity metadata visualization panel, wherein the sentiment analysis identifies an emotion of a second author of the entity metadata visualization panel;

generating a trending graph of the emotion of the first author and the emotion of the second author; and displaying, on the user interface, the trending graph.

6. The method of claim 1, wherein the knowledge base contains multiple disambiguation identifiers, and wherein the method further comprises:

hierarchically categorizing the multiple disambiguation identifiers;

generating a graph of the hierarchically categorized disambiguation identifiers; and displaying, on the user interface, the graph of the hierarchically categorized disambiguation identifiers.

7. The method of claim 1, further comprising:

performing an analysis of the entity metadata visualization panel to identify other topics presented in the entity metadata visualization panel;

generating a trending graph of the other topics presented in the entity metadata visualization panel; and displaying, on the user interface, the trending graph.

8. The method of claim 1, wherein an entity tag identifies an entity as being either a person, an organization, or a geopolitical entity, and wherein the method further comprises:

appending an entity tag to the first mention descriptor appended to the initial electronic document; and matching, by one or more processors, the entity tag from the first mention descriptor to an entity tag from the disambiguation identifier to further map the first mention descriptor to the disambiguation identifier.

9. The method of claim 1, wherein the first mention is not part of the entity metadata visualization panel.

10. The method of claim 1, wherein the first mention is a nominal term and the second mention is a pronominal phrase for a same entity.

11. The method of claim 1, wherein the initial electronic document is a first type of web log (blog) and the entity metadata visualization panel is a second type of blog, wherein the first type of blog is for a different subject than that of the second type of blog.

12. The method of claim 1, wherein the initial electronic document is a first webpage and the entity metadata visualization panel is a second webpage, wherein the first webpage is a different webpage than the second webpage.

13. A computer program product for displaying related content on a user interface, the computer program product comprising a computer readable storage medium having program code embodied therewith, the program code readable and executable by a processor to perform a method comprising:

analyzing an initial electronic document to identify a first mention in the initial electronic document;

generating a first mention descriptor of the first mention in the initial electronic document according to a context of the initial electronic document;

appending the first mention descriptor to the initial electronic document;

mapping the first mention descriptor from the initial electronic document to a disambiguation identifier from a knowledge base that contains a version of the first mention, wherein the disambiguation identifier is an entity within the knowledge base;

associating the disambiguation identifier with the initial electronic document;

locating the disambiguation identifier on an entity metadata visualization panel, wherein the disambiguation identifier was appended to the entity metadata visualization panel after mapping the entity metadata visualization panel to the disambiguation identifier from the knowledge base, and wherein the entity metadata visualization panel was mapped to the disambiguation identifier by mapping a second mention descriptor for a second mention in the entity metadata visualization panel to the disambiguation identifier;

retrieving the entity metadata visualization panel; and displaying, on the user interface, the entity metadata visualization panel as related content that is related to the first mention in the initial electronic document.

14. The computer program product of claim 13, wherein the entity metadata visualization panel is from a social media service, and wherein the method further comprises:

displaying a trending graph of the entity metadata visualization panel on the user interface, wherein the trending graph describes a frequency of the entity metadata visualization panel being viewed within predetermined time periods.

15. The computer program product of claim 13, wherein the social media service is a short messaging service.

16. The computer program product of claim 13, wherein the social media service is a video sharing service.

17. The computer program product of claim 13, wherein the method further comprises:

performing a sentiment analysis on the initial electronic document, wherein the sentiment analysis identifies an emotion of a first author of the initial electronic document;

performing a sentiment analysis on the entity metadata visualization panel, wherein the sentiment analysis identifies an emotion of a second author of the entity metadata visualization panel;

generating a trending graph of the emotion of the first author and the emotion of the second author; and displaying, on the user interface, the trending graph.

18. The computer program product of claim 13, wherein the knowledge base contains multiple disambiguation identifiers, and wherein the method further comprises:

hierarchically categorizing the multiple disambiguation identifiers;

generating a graph of the hierarchically categorized disambiguation identifiers; and displaying, on the user interface, the graph of the hierarchically categorized disambiguation identifiers.

19. The computer program product of claim 13, wherein the method further comprises:

performing an analysis of the entity metadata visualization panel to identify other topics presented in the entity metadata visualization panel;

generating a trending graph of the other topics presented in the entity metadata visualization panel; and displaying, on the user interface, the trending graph.

20. A computer system comprising:

a processor, a computer readable memory, and a non-transitory computer readable storage medium;

first program instructions to analyze an initial electronic document to identify a first mention in the initial electronic document;

second program instructions to generate a first mention descriptor of the first mention in the initial electronic document according to a context of the initial electronic document;

third program instructions to map the first mention descriptor to a disambiguation identifier from a knowledge base that contains a version of the first mention, wherein the disambiguation identifier identifies the mention within the knowledge base;

fourth program instructions to associate the disambiguation identifier with the initial electronic document;

fifth program instructions to locate the disambiguation identifier on an entity metadata visualization panel, wherein the disambiguation identifier was appended to the entity metadata visualization panel after mapping the entity metadata visualization panel to the disambiguation identifier from the knowledge base, and wherein the entity metadata visualization panel was mapped to the disambiguation identifier by mapping a second mention descriptor for a second mention in the entity metadata visualization panel to the disambiguation identifier;

sixth program instructions to retrieve the entity metadata visualization panel; and seventh program instructions to display, on the user interface, the entity metadata visualization panel as related content that is related to the first mention in the initial electronic document; and wherein the first, second, third, fourth, fifth, sixth, and seventh program instructions are stored on the non-transitory computer readable storage medium for execution by one or more processors via the computer readable memory.

\* \* \* \* \*